United States Patent
Lambert

(10) Patent No.: US 8,307,554 B1
(45) Date of Patent: Nov. 13, 2012

(54) CATCHER FOR HEDGE TRIMMER

(76) Inventor: Gene F. Lambert, Maryville, TN (US)

( * ) Notice: Subject to any disclaimer, the term of this patent is extended or adjusted under 35 U.S.C. 154(b) by 0 days.

(21) Appl. No.: 13/161,831

(22) Filed: Jun. 16, 2011

(51) Int. Cl.
*B26B 19/48* (2006.01)

(52) U.S. Cl. .................... 30/132; 30/124; 30/131

(58) Field of Classification Search ........... 30/124, 30/131, 132
See application file for complete search history.

(56) References Cited

U.S. PATENT DOCUMENTS

| | | | | |
|---|---|---|---|---|
| 2,281,189 A | * | 4/1942 | Wright | 30/132 |
| 2,415,648 A | * | 2/1947 | Marvin | 56/335 |
| 3,073,025 A | | 1/1963 | Yatsko | |
| 3,552,013 A | * | 1/1971 | Stone | 30/132 |
| 3,795,050 A | | 3/1974 | Latsha | |
| 3,916,521 A | | 11/1975 | Sekelsky | |
| 4,071,951 A | | 2/1978 | Burns | |
| 5,321,890 A | * | 6/1994 | LaBlue | 30/124 |
| D351,537 S | | 10/1994 | Yagin | |
| 5,653,029 A | | 8/1997 | Shigenaka | |
| 5,659,958 A | | 8/1997 | Goings | |
| 6,651,343 B2 | * | 11/2003 | Laren et al. | 30/133 |
| 7,424,777 B2 | * | 9/2008 | Namvar | 30/131 |
| 7,934,318 B2 | * | 5/2011 | Sowell et al. | 30/132 |
| 8,042,275 B2 | * | 10/2011 | Sergyeyenko | 30/131 |
| 2010/0146794 A1 | * | 6/2010 | Marcoe | 30/124 |

* cited by examiner

*Primary Examiner* — Hwei C Payer
(74) *Attorney, Agent, or Firm* — Luedeka Neely Group, PC

(57) ABSTRACT

A clippings catcher that attaches to a trimmer having a guard and motor driven reciprocating cutting blades for catching vegetation clippings regardless of the direction in which the trimmer is moved when cutting vegetation, and having a section of flexible fabric configured to result in a desired billowing of the fabric which enables an effective structure for catching vegetation clippings regardless of the direction in which the trimmer is moved while avoiding interference between the fabric and the blades of the trimmer.

4 Claims, 3 Drawing Sheets

CATCHER FOR HEDGE TRIMMER

FIELD

This disclosure relates to clippings catchers. More particularly, this disclosure relates to a catcher for attachment to a hedge trimmer that is of simplified construction and operation.

BACKGROUND

Attempts have been made to provide catchers that attach to a trimmer and are able to catch vegetation clippings regardless of the direction in which the trimmer is moved when cutting vegetation. However, such conventional devices are overly complicated in construction and operation and improvement is desired.

Accordingly, improvement is desired in the construction and operation of clippings catchers.

SUMMARY

The above and other needs are met by a clippings catcher that attaches to a trimmer having a guard and motor driven reciprocating cutting blades of substantially similar length for catching vegetation clippings regardless of the direction in which the trimmer is moved when cutting vegetation.

In accordance with the disclosure, the catcher includes an upper support rod and a lower support rod connected to the guard of the trimmer and substantially aligned with one another so as to overlie the cutting blades and extend away from the guard, the support rods being spaced apart a first distance, and a section of flexible fabric having opposite length edges connected to the support rods, the fabric having a width corresponding to a second distance.

The first distance ranges in an amount of from about 40 percent to about 60 percent of the second distance to yield a desired billowing of the fabric which enables an effective structure for catching vegetation clippings while avoiding interference between the fabric and the blades of the trimmer.

Catchers according to the disclosure advantageously enable a simple and uncomplicated structure that catches clippings regardless of the direction of cutting, while being of sufficiently compact so as to avoid interference with the mobility of the cutter during use.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
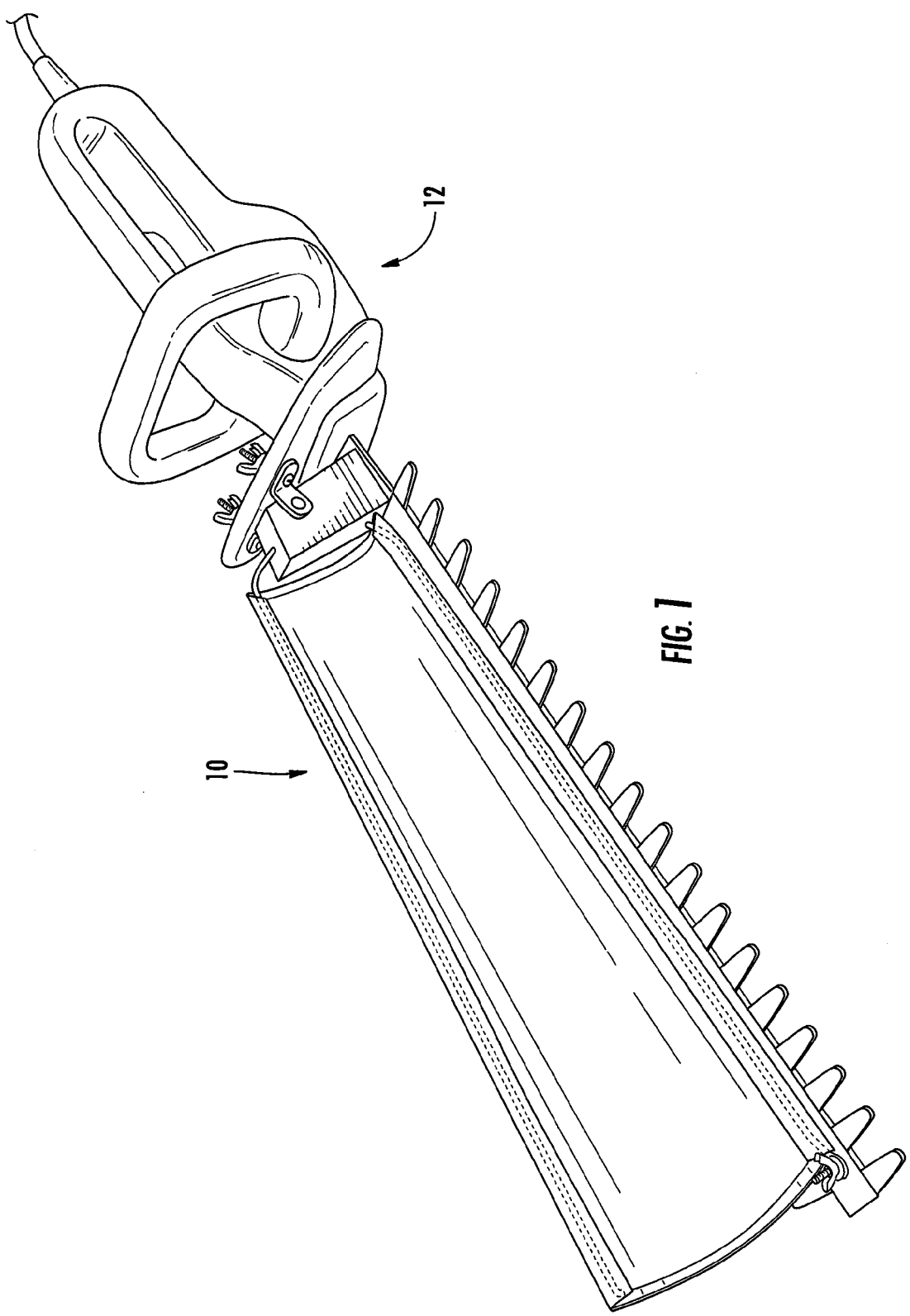
FIG. 1 is perspective view of a clippings catcher according to the disclosure installed on a hedge trimmer.
Figure 2:
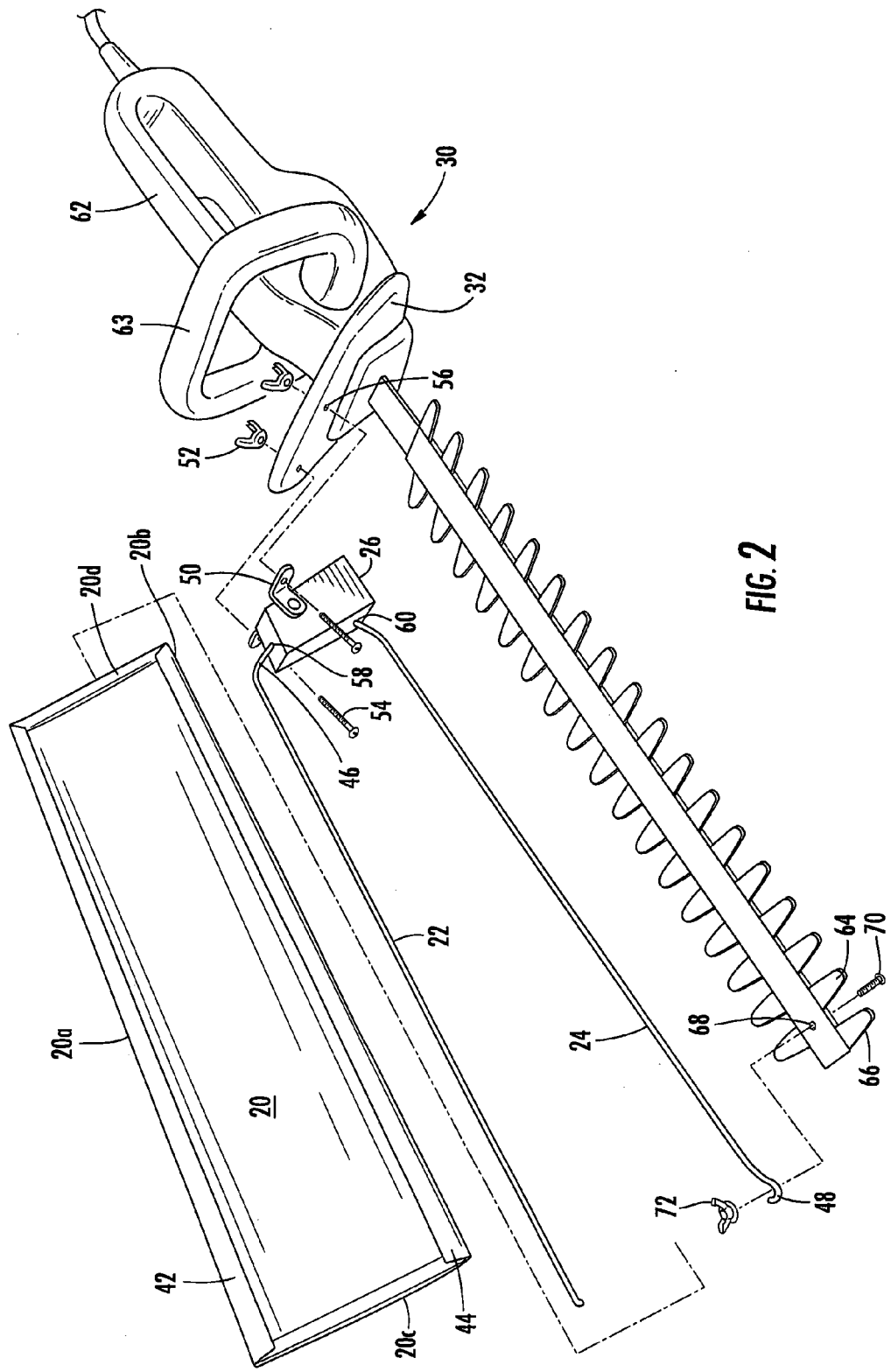
FIG. 2 is an exploded view of FIG. 1.

With reference to the drawings, the disclosure relates to a clippings catcher 10 that attaches to a trimmer 12 for catching vegetation clippings regardless of the direction in which the trimmer 12 is moved when cutting vegetation.

The catcher 10 includes, as major components, an elongate section of fabric 20, an upper support rod 22, a lower support rod 24, and a support bracket 26. The trimmer 12 may be a conventional gasoline or electric trimmer and includes a body 30, a guard 32, and a blade assembly 34 extending from the body 30 in front of the guard 32, generally including a static blade and a reciprocating blade powered by a motor contained within the body 30. The catcher 10 is easily mounted to the trimmer 12 for catching clippings regardless of the direction in which the trimmer is moved when cutting vegetation, as explained more fully below.

The fabric 20 is a flexible and durable fabric, such as canvas or the like, and is configured to be substantially rectangular, having a pair of opposite and parallel upper side 20a and lower side 20b, distal end 20c, and proximal end 20d. However, it is preferred that the proximal end 20d be angled inwardly from the bottom to the top to substantially correspond to the angle of the guard 32. Sleeves 42 and 44 are defined adjacent the sides 20a and 20b for receiving the support rods 22 and 24, respectively. In regards to the flexibility of the fabric 20, it will be seen in FIG. 3 that the fabric 20 is able to billow to either side of the blade assembly 34 for catching clippings.

The fabric 20 has a length sufficient to substantially correspond to the length of the blade assembly 34. For example, for use with a blade assembly having a length of about 16 inches, the fabric 20 may have a length of about 19 inches. The width of the fabric 20 is selected so that a desired billowing is provided and the overall height of the catcher 10 as defined by the upper side 20a is substantially proximate with the uppermost edge of the guard 32 so as to not extend upwardly in an obtrusive manner that would interfere with mobility during operation of the trimmer 12. In this manner, unlike conventional catchers, the catcher 10 avoids becoming cumbersome to the use of the trimmer 12, especially in tight quarters where the bulky structure of conventional catchers undesirably impacts the ability to effectively use the trimmer. For example, catchers which extend outwardly from the trimmer in an obtrusive manner can engage portions of the vegetation and complicate the desired trimming operation.

Figure 3:
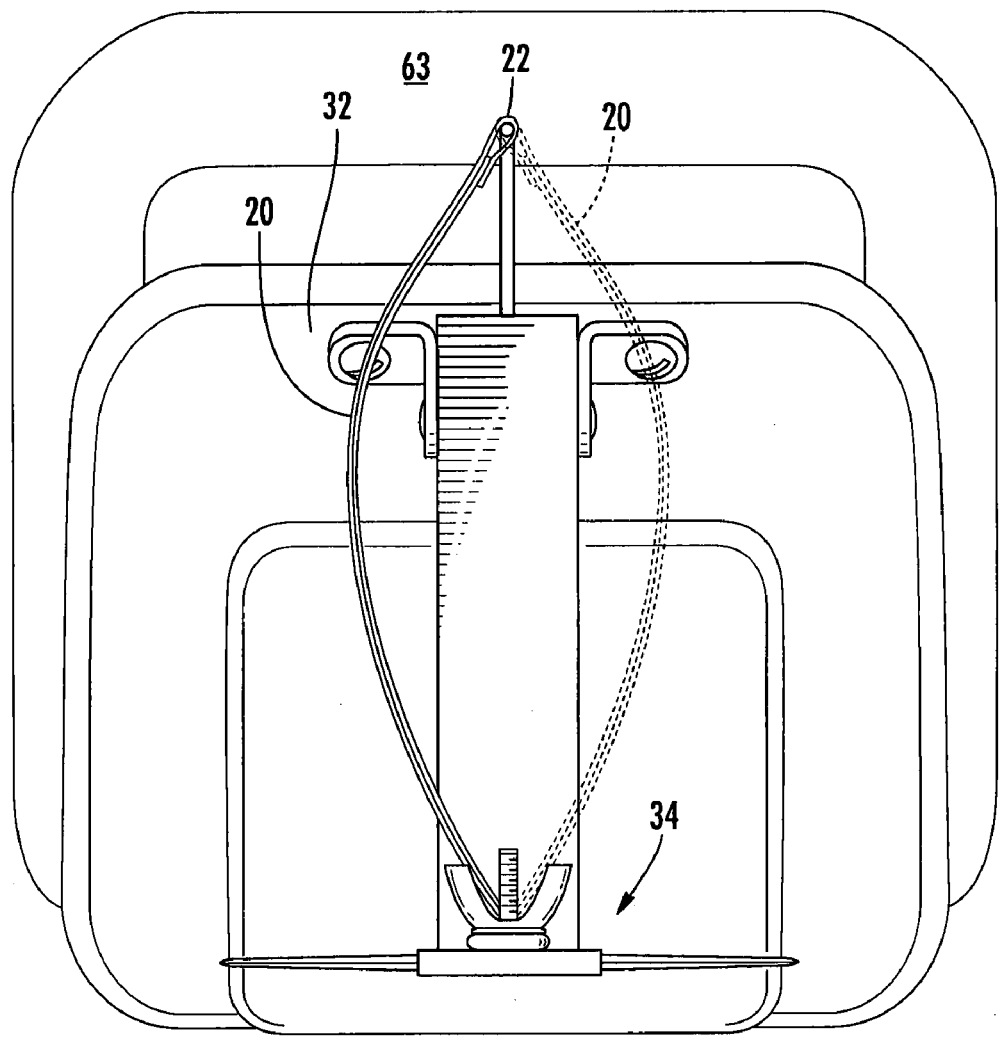
FIG. 3 is a front end view of FIG. 1 with the catcher also shown in phantom to depict movement of the catcher as may be desired during use.

For the purpose of example, the support rods 22 and 24 are preferably spaced apart a distance of about 5 inches, substantially corresponding to the height of the guard 32, while the width of the fabric 20 is from about 8 to about 12 inches, most preferably about 10 inches, such that from about 40 to about 60 percent of the width of the fabric 20 is available for billowing, as shown in FIG. 3. It will be appreciated that too little billowing will not yield an effective structure for catching grass clippings. Having too much billowing will enable excessive billowing such that the fabric 20 may undesirably extend into the blade assembly 34. Thus, it has been discovered that having the spacing of the support rods 22 and 24 in relation to the width of the fabric 20 within in a range of from about 60 percent (5 inches divided by 8 inches) to about 40 percent (5 inches divided by 12 inches) yields a desired billowing which enables an effective structure for catching clippings while avoiding interference between the fabric 20 and the blades of the trimmer 12.

The upper support rod 22 may be provided as by a length of substantially rigid wire that is slightly longer than the length of the fabric 20. The upper support rod 22 is substantially linear, but may include a curved portion 46 at its proximal end for cooperating with the support bracket 26. The lower support rod 24 is of similar construction as the upper support rod 22, but includes a bend 48 or like feature at its distal end for facilitating attachment of the distal end to the blade assembly 34, explained more fully below.

The support bracket 26 is configured to provide a rigid structure for securing the support rods 22 and 24 at a desired spaced apart distance from one another adjacent the guard 32. That is, the bracket enables mounting of the upper support rod 22 so that it extends a desired distance above and substantially parallel to the blade assembly 34, and the lower support rod 24 overlies the blade assembly 34 and is below the upper support rod 22. The support bracket 26 may be a separate component or, the guard 32 may be manufactured to integrally include structure corresponding to the support bracket 26.

The bracket 26, if provided as a separate component from the guard 32, may be attached to the guard 32 as by mounts 50 and corresponding fasteners, such as nuts 52 and bolts 54, inserted through cooperating apertures 56 through the guard 32. The bracket 26 includes rod apertures 58 and 60 for receiving the proximal ends of the upper support rod 22 and the lower support rod 24, respectively.

The body 30, for an electric trimmer, is typically a plastic body containing a motor and electronics to control the motor and having handles 62 and 63 for grasping by the user. The guard 32 is located at the distal end of the body 30 to shield the user from the blade assembly 34. Typically, the guard 32 may be molded with the body 30, but may be a separate attached component.

The blade assembly 34 is operatively connected to the motor within the body 30 and includes a lower moving blade 64 and an overlying static blade 66 such that the moving blade 64 is reciprocated by the motor relative to the static blade 66 for cutting of vegetation. An aperture 68 at the distal end of the blade assembly 34 typically receives a fastener 70 secured by a nut 72 to connect the static blade 66 (or a retainer therefor) and an underlying retainer or like structure for the moving blade 64 to provide the blade assembly 34. The lower support rod 24 may be attached to the blade assembly 34 as by inserting the bend 48 of the lower support rod 24 underneath the nut 72. Thus, in this manner, the lower support rod 24 may be attached to the blade assembly 34 without requiring any modification of the blade assembly 34.

In addition, the billowing of the fabric 20 together with the mounting of the support rods 22 and 24 to substantially overlie the midpoint of the width of the blade assembly 34 enables the fabric 20 to be billowed in either direction as depicted in FIG. 3 so that vegetation clippings may be caught by the catcher 10 regardless of the direction in which the trimmer 12 is moved when cutting vegetation.

Thus, it will be appreciated that catchers according to the disclosure advantageously enable a simple and uncomplicated structure that catches clippings regardless of the direction of cutting, while being of sufficiently compact so as to avoid interference with the mobility of the trimmer 12 during use.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A clippings catcher in combination with a trimmer, wherein the catcher is attached to the trimmer, and the trimmer has a guard and motor driven reciprocating cutting blades for catching vegetation clippings regardless of the direction in which the trimmer is moved when cutting vegetation, the catcher comprising:
   an upper support rod and a lower support rod connected to the guard of the trimmer and substantially aligned with one another so as to overlie the cutting blades and extend away from the guard, the support rods being spaced apart a first distance, and a section of flexible fabric having opposite length edges connected to the support rods, the fabric having a width corresponding to a second distance,
   wherein the first distance ranges in an amount of from about 40 percent to about 60 percent of the second distance to yield a desired billowing of the fabric which enables an effective structure for catching vegetation clippings regardless of the direction in which the trimmer is moved while avoiding interference between the fabric and the blades of the trimmer.

2. The combination of claim 1, wherein the cutting blades of the trimmer have a substantially similar length and the fabric has a length that substantially corresponds to the length of the blades.

3. The combination of claim 1, further comprising a bracket for connecting the support rods to the guard.

4. A clippings catcher attachable to a trimmer having a guard and motor driven reciprocating cutting blades for catching vegetation clippings regardless of the direction in which the trimmer is moved when cutting vegetation, the catcher comprising:
   an upper support rod and a lower support rod connectable to the guard of the trimmer and substantially aligned with one another so as to overlie the cutting blades and extend away from the guard, the support rods being spaced apart a first distance; and
   a section of flexible fabric having opposite length edges connected to the support rods, the fabric having a width corresponding to a second distance,
   wherein the first distance ranges in an amount of from about 40 percent to about 60 percent of the second distance to yield a desired billowing of the fabric which enables an effective structure for catching vegetation clippings regardless of the direction in which the trimmer is moved while avoiding interference between the fabric and the blades of the trimmer.

* * * * *